United States Patent [19]

Smals et al.

[11] Patent Number: 4,828,393

[45] Date of Patent: May 9, 1989

[54] METHOD FOR OBTAINING A BASE MATERIAL FOR BUILDING MORTAR

[75] Inventors: Michael R. Smals, Herten; Peter C. Thissen, Helden; Jan J. Tiemersma, Asselt-Swalmen, all of Netherlands

[73] Assignee: 501 B.V. Grint, Netherlands

[21] Appl. No.: 23,265

[22] Filed: Mar. 9, 1987

[30] Foreign Application Priority Data

Mar. 14, 1986 [NL] Netherlands ........................ 8600665

[51] Int. Cl.[4] .......................... B28C 5/36; B28C 7/04; C04B 7/02; C04B 18/08

[52] U.S. Cl. .......................................... 366/2; 106/97; 106/DIG. 1; 366/8

[58] Field of Search ......................... 366/2, 6, 7, 8, 16, 366/19, 27, 28, 29, 30, 33, 49; 106/97, 98, DIG. 1

[56] References Cited

U.S. PATENT DOCUMENTS

| | | | |
|---|---|---|---|
| 1,521,967 | 1/1925 | Powers | 106/98 |
| 2,564,690 | 6/1948 | Havelin et al. . | |
| 2,863,651 | 12/1958 | McBride | 366/19 X |
| 3,486,917 | 12/1969 | Wallis . | |
| 4,121,945 | 10/1978 | Hurst et al. | 106/DIG. 1 X |
| 4,210,457 | 7/1980 | Dodson et al. | 106/98 X |
| 4,222,785 | 9/1980 | Henderson | 106/97 |
| 4,268,316 | 5/1981 | Wills, Jr. | 106/97 |
| 4,453,978 | 6/1984 | Okimura et al. | 106/88 |
| 4,488,910 | 12/1984 | Nicholson et al. | 106/90 |
| 4,715,719 | 12/1987 | Ito et al. | 366/2 |

FOREIGN PATENT DOCUMENTS

| | | | |
|---|---|---|---|
| 2543110 | 3/1977 | Fed. Rep. of Germany . | |
| 2905186 | 8/1980 | Fed. Rep. of Germany . | |
| 3113501 | 12/1982 | Fed. Rep. of Germany . | |
| 2484664 | 12/1981 | France . | |
| 8105887 | 7/1983 | Netherlands . | |
| 970847 | 9/1964 | United Kingdom | 366/8 |

*Primary Examiner*—Harvey C. Hornsby
*Assistant Examiner*—Scott J. Haugland
*Attorney, Agent, or Firm*—John P. Snyder

[57] ABSTRACT

A method wherein the extraction of a quantity of sand, with a granular size and distribution ratio, are subjected to a moisturing or dewatering treatment until a moisture content of a maximum of 15% m/m is attained; supplying and/or storing in bulk of an aggregate, such as fly-ash, with a smaller granular size than that of the sand fraction; and feeding and mixing the sand fraction and aggregate by means of a through-flow process, the mixture being poured or delivered so that a base material for mortar will have an optimal grain size distribution ratio and homogeneous composition.

16 Claims, 1 Drawing Sheet

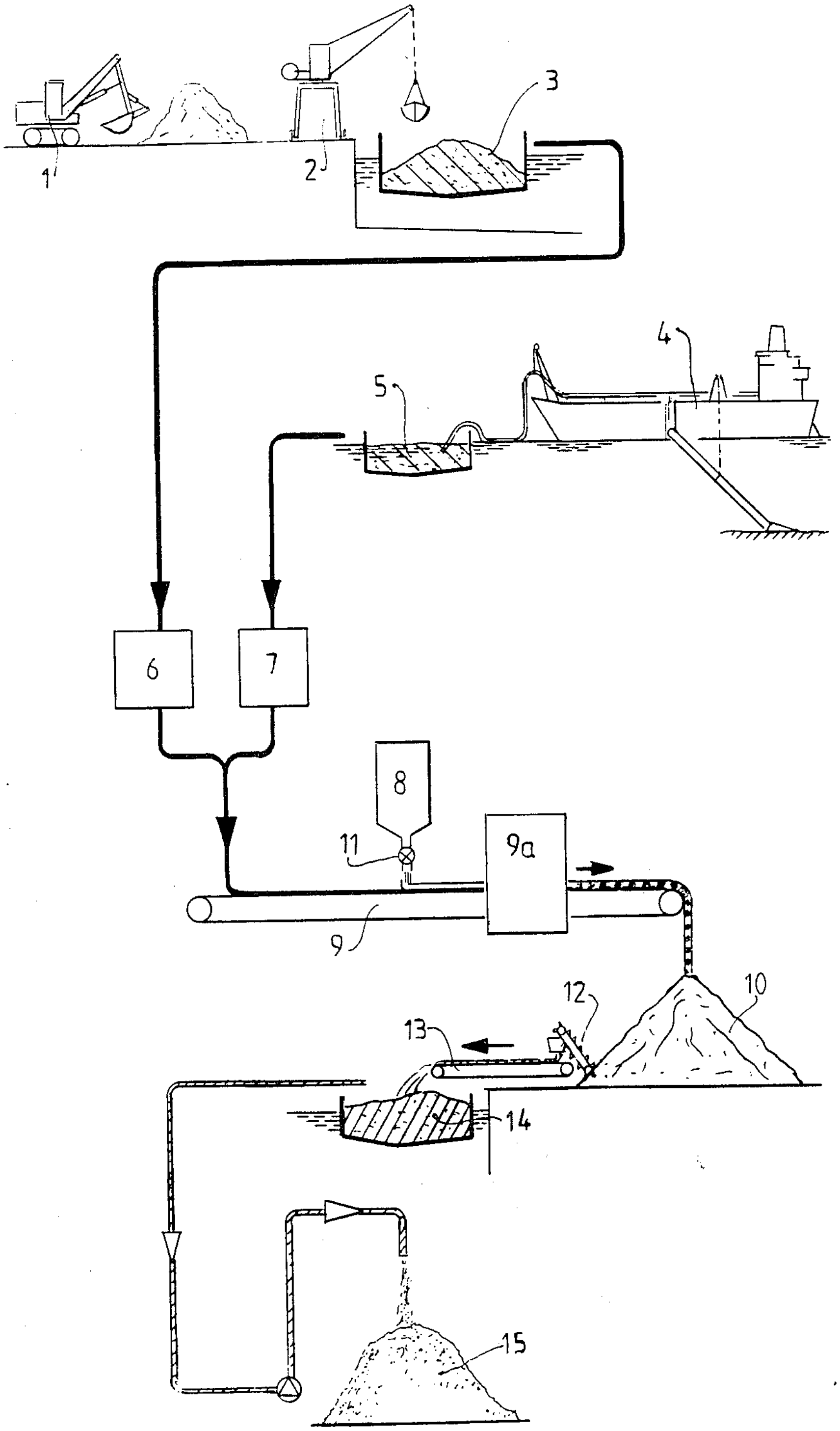
1
2
3
4
5
6
7
8
9a
11
9
12
10
13
14
15

METHOD FOR OBTAINING A BASE MATERIAL FOR BUILDING MORTAR

BACKGROUND AND SUMMARY OF THE INVENTION

The invention relates to a method for obtaining a base material for building mortar, such as concrete-or masonry mortar and the like, this base material containing a sand fraction.

The invention relates particularly to the processing of base materials in large quantities, that is, in bulk quantities. It is usual to transport the base materials for the concrete industry, and specifically the sand used in the industry, from the extraction location to the place of use by inland waterway vessel. The concrete manufacturer or other user will separate out a small quantity of sand on the spot from the quantity supplied and mix it with cement and other aggregates in order to obtain the required concrete or masonry mortar. The drawback to such a method is that the aggregates have to be stored separately on the premises of the user, which, especially with substances having puzzolanic properties, that is the substance hardens under the influence of lime and moisture, is problematic with respect to storage costs and the attaining of the required percentage of aggregate.

The invention has for its object to provide a method whereby the above mentioned drawbacks are obviated, and the method is distinguished as such by:

the extraction at an extraction location and the separating out at a refining location of a quantity of sand with a granular size and distribution ratio lying within predetermined boundaries, the subjecting of this quantity of sand to a moisturing or dewatering treatment until a moisture content of a maximum of 15% m/m is attained, the supplying and/or storing in bulk of an aggregate with a smaller granular size than that of the sand fraction, the dosed feeding and mixing of the sand fraction and aggregate by means of a through-flow process, the mixture obtained being poured or delivered in bulk as the required base material.

The invention is based on the idea of pre-treating the sand obtained at an extraction location in order to be able to provide the required base material already mixed in bulk to the end consumer. In view of the fact that the sand in a particular extraction location has a determined median granular size, the total grain size distribution ratio of the mix can be controlled better by the addition of an aggregate with a smaller granular size. As the starting point for the final concrete or masonry mortar, the base material is therefore of higher quality as a result of this more favourable grain size distribution ratio. The consumer is moreover no longer burdened with mixing aggregates himself, but purchases an already adapted base material of pre-determined homogeneous composition, conforming to the current NEN or international norms. Transportation of the sand fraction and aggregates can be carried out in bulk, which results in cost saving.

The invention proposes as a suitable aggregate the use of fly ash from for example electricity power stations. The aggregate, fly ash, can be provided in bulk from such large scale concerns, so that it can be mixed with the sand fraction that is present in bulk in an effective manner.

The use of fly ash in the mix provides the advantage that in the manufacture of concrete a part of the cement fraction can be substituted. It has been found in experiments that the substitution of 15% by weight of cement by fly ash, that is, approximately 5% by weight relative to sand, produces a quality of concrete with a final strength comparable to or higher than that of concrete with an unchanged content of cement. During setting there is a lower hydration heat because of the smaller quantity of cement in the concrete, such concrete moreover having a better resistance to sulphate corrosion as well as a lower permeability to aggressive liquids and gases.

The invention will be further elucidated in the following figure description of an embodiment.

BRIEF DESCRIPTION OF THE DRAWING

The single FIGURE of the drawing illustrates, schematically, the process steps involved in making the improved building mortar mix of this invention.

DETAILED DESCRIPTION OF THE INVENTION

In the annexed drawing the upper section shows a so-called dry extraction of sand. The sand is extracted by means of mechanical excavators 1 and stored in bulk, after which it can be carried away by means of mechanical transporters 2 into a transportation vessel 3.

The second part of the drawing shows the so-called wet extraction of sand, which can be performed for example by a suction dredger 4, which can store the extracted sand directly into a vessel 5 and transport it away.

Dry extraction or wet extraction has the consequence that the extracted sand has to be either moistened at a station 6 indicated in the drawing, or dewatered at station 7. The sand is conditioned here such that there is a moisture content of 5%–15% m/m present in the sand fraction.

The moisture content of the sand fraction is of particular importance in the current invention because, especially where hygroscopic aggregates are used, the moisture content must be exactly sufficient to be able to bind the aggregate to the sand without the occurrence of side effects such as hardening. A slightly moist sand is moreover advantageous since storage can take place in the open air without it being necessary to take extra technical measures to protect the environment.

In the third part of the drawing, after being brought to the correct degree of moistness, the conditioned sand is mixed with an aggregate which is stored in bulk in the silo 8. The aggregate 8 is of smaller granular size than the median granular size of the sand fraction. By the use of fly ash as the aggregate 8, it has been found that it should be of median grain size lying between 10 and 45 microns and may be substituted for 15% by weight of the cement used in making a standard cement mortar mix which is cement, sand and water in which the ratio of sand to cement is approximately 3:1. This substitution (i.e., sand to cement ratio of approximately 3:0.85 with fly ash of 0.15, all by weight) has been found to result in lower hydration heat and to yield a building mortar having a final strength comparable to or higher than that of a building mortar with an unchanged (i.e., standard) content of cement. Further, the substitution provides a building mortar having a better resistance to sulphate corrosion as well as a lower permeability to aggressive liquids and gases. Mixing is preferably carried out in a through-flow process, this being suitable for the large treated quantities of sand material, and the process ends for example on a conveyor belt 9 which leads from the moisture treatment station via a mixing installation 9*a* to a new storage location 10. The aggregate 8 is fed in doses onto this conveyor belt 9 by means of a dosage device 11.

As a result of the moisture content referred to above, no separating out of the two fractions will take place when they are stored in bulk at location 10.

The base material thus obtained at location 10 can be taken by any random transport means 12, 13 to a transportation vessel 14, which can ship the base material to, for example, the premises 15 of a concrete mortar manufacturer.

It will be apparent that the above specified method is described only by way of example and that various alterations can be made within the frame of reference of the invention.

Thus, for example, it is not essential to cause the dosed feeding onto the conveyor belt 9 to take place only under the influence of gravity, but the mixing can also be pneumatic. The locations 7–9*a* can be arranged on a suction dredger.

Depending on the nature of the aggregate (strongly hygroscopic) it can be advantageous to cover the storage location either completely or partially. This is also of importance when storage is long term, so that precipitation cannot leach the aggregate out of the storage 10.

We claim:

1. Method for obtaining a base material for building mortar, such as concrete or masonry mortar and the like, which base material consists of a sand fraction and an aggregate fraction, which comprises the steps of:
   - extracting a quantity of sand at an extraction location and separating out the quantity of sand at a refining location to provide a separated quantity of sand with a granular size and distribution ratio lying within predetermined boundaries,
   - adjusting the moisture content of the separated quantity of sand to a moisture content of a maximum of 15% by weight to provide the sand fraction,
   - providing a bulk of an aggregate fraction having a smaller granular size than that of said sand fraction,
   - flowing said sand fraction and the aggregate fraction into dosed admixture to provide a bulk quantity of the base material,
   - storing the bulk quantity of base material, and
   - transporting the stored base material to a location of concrete or mortar manufacture.

2. Method as claimed in claim 1, characterized in that the grain size of the sand fraction is of a dimension such that the residue from a 250 μm sieve is >70% by weight and from a 125 μm sieve is >90% by weight.

3. Method as claimed in claim 2 wherein the aggregate is fly ash with a median grain size lying between 10 and 45 microns.

4. Method as claimed in claim 3 wherein the sand fraction is wet extracted and is subjected to a dewatering treatment.

5. Method as claimed in claim 2 wherein the sand fraction is wet extracted and is subjected to a dewatering treatment.

6. Method as claimed in claim 2 wherein the sand fraction is dry extracted and is subjected to a moisturing treatment.

7. Method as claimed in claim 1, characterized in that the aggregate fraction is fly ash with a median grain size lying between 10 and 45μ.

8. Method as claimed in claim 7 wherein the sand fraction is wet extracted and is subjected to a dewatering treatment.

9. Method as claimed in claim 7 wherein the sand fraction is dry extracted and is subjected to a moisturing treatment.

10. Method as claimed in claim 1, characterized in that the sand fraction is wet extracted and is subjected to a dewatering treatment.

11. Method as claimed in claim 1, characterized in that the sand fraction is dry extracted and is subjected to a moisturing treatment.

12. The method of preparing a base material for building mortar, such as concrete or masonry mortar and the like in which sand is to be mixed with cement at an approximate weight ratio of 3 parts sand to 1 part cement to yield a concrete having a particular final strength, which comprises the steps of providing a bulk quantity of a sand fraction having a granular size such that the residue from a 250 μm sieve is >70% by weight and the residue from a 125 μm sieve is >90% by weight and a moisture content adjusted to 5–15% by weight flowing the bulk quantity of sand fraction while flowing a bulk quantity of an aggregate having a smaller particle size than the sand fraction into admixture with the sand fraction to obtain a bulk quantity of base material having about 5% by weight of the aggregate therein.

13. The method as defined in claim 12 wherein the aggregate is fly ash.

14. The method as defined in claim 12 wherein the aggregate is fly ash having a particle size lying between 10 and 45 microns.

15. The method of preparing a building mortar such as concrete or masonry mortar improved with respect to a standard concrete mortar obtained from a mix in which a sand fraction is mixed with a cement fraction at an approximate weight ratio of 3:1 plus water, to yield a standard concrete mortar mix having a particular final strength, which comprises the steps of:
   - providing a bulk quantity of sand fraction having a granular size such that the residue of the sand fraction passed through a 250 μm sieve is >70% by weight and the residue of the sand fraction passed through a 125 μm sieve is >90% by weight and having a moisture content adjusted to 5–15% by weight,
   - providing a bulk quantity of fly ash aggregate fraction having a smaller particle size than the sand fraction,
   - flowing the bulk quantity of sand fraction while flowing the bulk quantity of fly ash aggregate fraction into admixture with the sand fraction to obtain a bulk quantity of homogeneous base material mix which is moisturized sand and fly ash having about 5% by weight of the fly ash aggregate therein,
   - storing the bulk quantity of base material mix until required for use to manufacture concrete mortar,
   - transporting a quantity of the stored bulk quantity of the base material mix to a location of concrete mortar manufacture, and then
   - substituting 15% of the cement fraction with fly ash by mixing the transported base material mix with cement fraction at the location of concrete mortar manufacture to yield building mortar mix improved with respect to the standard concrete mortar mix by having a lower heat of hydration, a final strength comparable to or higher than said particular final strength, and a better resistance to sulfate corrosion as well as a lower permeability to aggressive liquids and gases.

16. The method as defined in claim 15 wherein the fly ash has a particle size lying between 10 and 45 microns.

* * * * *